United States Patent
Montemurro et al.

(10) Patent No.: US 8,666,394 B1
(45) Date of Patent: Mar. 4, 2014

(54) METHODS AND APPARATUS FOR USE IN NEGOTIATING A GROUP OWNER FOR A P2P NETWORK HAVING EXTERNAL NETWORK CONNECTIVITY

(71) Applicant: Research In Motion Limited, Waterloo (CA)

(72) Inventors: Michael Peter Montemurro, Mississauga (CA); Stephen McCann, Rownhams (GB)

(73) Assignee: Blackberry Limited, Waterloo, Ontario (CA)

( * ) Notice: Subject to any disclaimer, the term of this patent is extended or adjusted under 35 U.S.C. 154(b) by 0 days.

(21) Appl. No.: 13/673,157

(22) Filed: Nov. 9, 2012

(51) Int. Cl.
*H04W 36/14* (2009.01)

(52) U.S. Cl.
USPC .................................. 455/426.1; 370/254

(58) Field of Classification Search
USPC ............ 455/426.1, 444, 411, 450, 41.2, 3.06; 370/254
See application file for complete search history.

(56) References Cited

U.S. PATENT DOCUMENTS

| | | |
|---|---|---|
| 2011/0082905 A1 | 4/2011 | Wentink et al. |
| 2011/0093536 A1 | 4/2011 | Wentink |
| 2011/0201275 A1* | 8/2011 | Jabara et al. ................. 455/41.2 |
| 2011/0225305 A1 | 9/2011 | Vedantham et al. |
| 2013/0231044 A1* | 9/2013 | Wang .......................... 455/3.06 |

* cited by examiner

*Primary Examiner* — Phuoc H Doan
(74) *Attorney, Agent, or Firm* — Perry + Currier Inc.

(57) ABSTRACT

Techniques in a wireless device for use in negotiating a group owner with another wireless device for establishing a wireless peer-to-peer (P2P) network having a connection to an external network are described. The wireless device identifies whether it is operating for communications via a home network or a non-home network. The wireless device sets its group owner intent value to an increased value when it is identified to be operating for communications via the home network, or to a decreased value when it is identified to be operating for communications via the non-home network. The wireless device then sends to the other wireless device a message which includes the group owner intent value for the wireless device. Once the group owner is selected, the wireless device will connect with the other wireless device for establishing the wireless P2P network having the connection to the external network.

20 Claims, 7 Drawing Sheets

METHODS AND APPARATUS FOR USE IN NEGOTIATING A GROUP OWNER FOR A P2P NETWORK HAVING EXTERNAL NETWORK CONNECTIVITY

BACKGROUND

1. Field of the Technology

The present disclosure relates generally to techniques in devices configured for wireless communications, and more particularly to techniques for use in negotiating a group owner (GO) in a Wi-Fi Peer-to-Peer (P2P) network having a data connection to an external network (e.g. the Internet).

2. Description of the Related Art

A wireless communication device, such as a portable wireless telephony device or smartphone, may be configured to communicate in wireless communication networks. For example, such a device may communicate in cellular telecommunications networks and/or wireless local area networks (WLANs) in accordance with IEEE 802.11 standards. Such a device may additionally communicate using peer-to-peer communication techniques, for example, being certified as a "Wi-Fi Direct" device in accordance with the Wi-Fi Peer-To-Peer (P2P) Technical specification.

There is a need for efficiently controlling connectivity to such wireless networks in these and similar environments.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

Techniques in a wireless device for use in negotiating a group owner with another wireless device for establishing a wireless Peer-to-Peer (P2P) network having a connection to an external network are described herein. The wireless device identifies whether it is operating for communications via a home network or a non-home network. The wireless device sets its group owner intent value to an increased value when it is identified to be operating for communications via the home network, or to a decreased value when it is identified to be operating for communications via a non-home network. The wireless device then sends to the other wireless device a message which includes the group owner intent value for the wireless device. Once the group owner is determined, the wireless device will connect with the other wireless device for establishing the wireless P2P network having the connection to the external network.

Example Environment.

Figure 1:
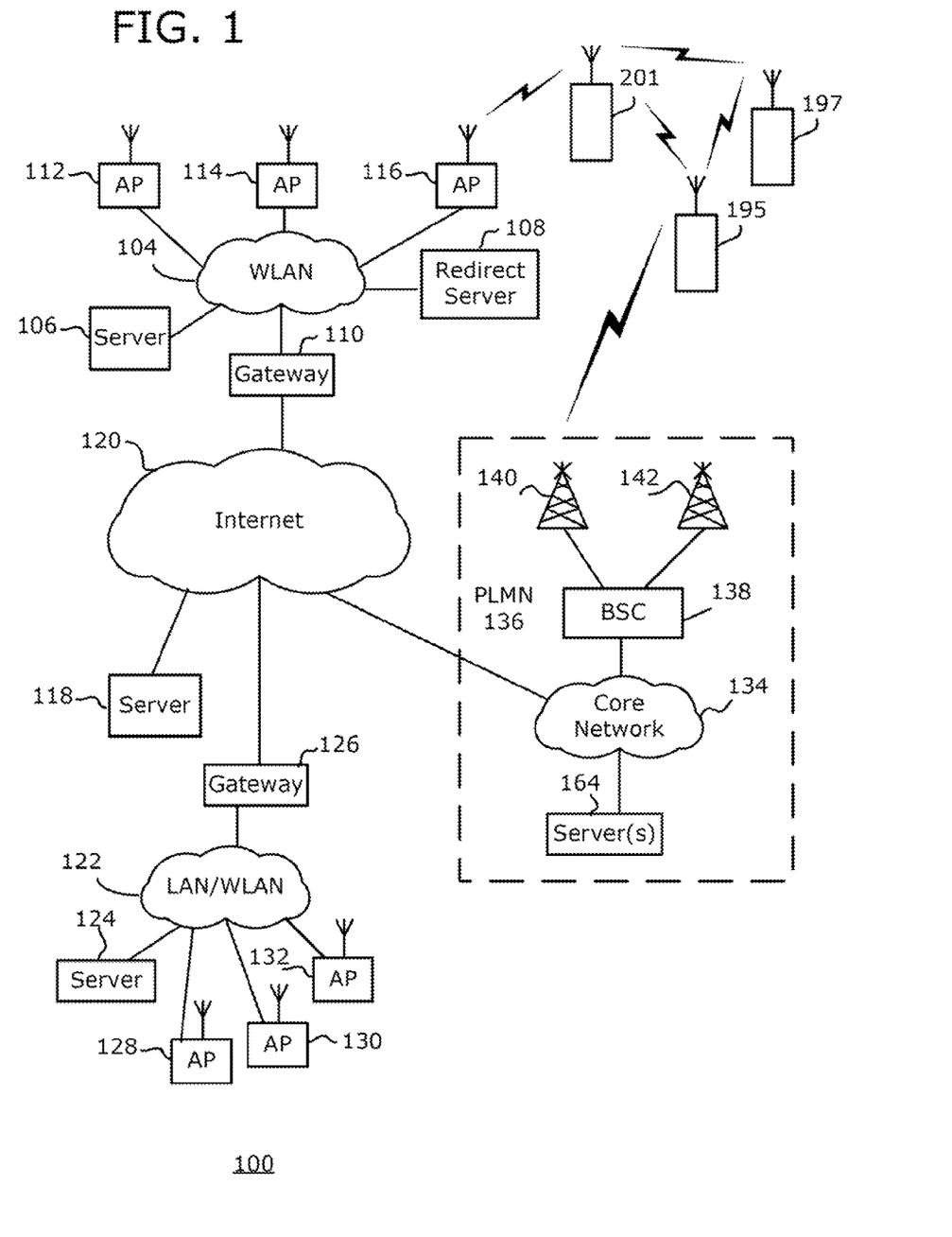
FIG. 1 is an illustrative representation of a communication system which includes wireless communication networks (e.g. WLANs) through which a wireless communication device may communicate.

To illustrate one environment within which the techniques of the present disclosure may be practiced, FIG. 1 illustrates a wireless communication device 201 which may communicate in a communication system 100. In the communication system 100, wireless device 201 may communicate with one or more wireless communication networks. For example, wireless device 201 may communicate with a wireless communication network 104 which is a wireless local area network (WLAN). Here, wireless network 104 and wireless device 201 may operate in accordance with IEEE 802.11 standards.

In this example, wireless network 104 has a plurality of wireless access points (APs) 112, 114, and 116 for wireless communications with wireless device 201. WLANs may be identified by a wireless device 201 with use of a wireless network identifier which is communicated from the WLAN. The wireless network identifier may be, for example, a Set Service Identifier (SSID) or Homogeneous Extended SSID (HESSID). In this example, wireless network 104 includes one or more servers 106, a redirect server 108, and a gateway 110. Server 106 may provide data, applications, and/or functionality for communication services for wireless device 201.

Wireless network 104 may be a public Wi-Fi "hotspot" for public use, and include what may be referred to as a "hotspot 2.0," "Passpoint," "captive portal," or "walled garden." For devices connected in wireless network 104 via one of wireless APs 112, 114, and 116, gateway 110 is configured to permit or deny access to the data, applications, and/or functionality, as well as to permit or deny external access outside of wireless network 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in wireless network 104 is made prior to proper authorization, gateway 110 is configured to redirect the request to redirect server 108. In response, redirect server 108 is configured to respond to wireless device 201 to provide data for producing information (e.g. Web page information) which is rendered in a user interface (UI) (e.g. a display) of wireless device 201 via a Web browser application. The information may solicit a user response. For example, the information may solicit a user registration or login with user fields for entering a user name and/or password information. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of wireless network 104.

Wireless device 201 may also operate for communications in other different wireless networks, such as a wireless network 122 which is also a WLAN. In this example, wireless network 122 is a private communication network of an enterprise (e.g. an organization, a company, a corporation, etc.) of wireless device 201. Similar to wireless network 104, wireless network 122 has a plurality of wireless APs 128, 130 and 132, one or more servers 124, and a gateway 126. For devices connected in wireless network 122 via one of wireless APs 128, 130, and 132, gateway 126 may be configured to permit or deny access to the data, applications, and/or functionality offered via wireless network 122 depending on whether or not a device has been authorized and what access rights are given upon authorization. For devices attempting to access wireless network 122 via Internet 120, gateway 126 is configured to permit or deny internal access to the data, applications, and/or functionality in wireless network 122.

Such wireless networks (e.g. infrastructure WLANs) may provide or allow access to various data and communication services to its terminals. For example, the wireless networks may provide for communication access to Internet 120 via the Web browser application, or voice telephony communication service with use of Voice over IP (VoIP) communication, or other communication services. For "push-type" data or message synchronization services, for example, wireless device 201 may be enabled to maintain data synchronization with a server (e.g. server 106) for user data of an application associated with a user account. The application of wireless device 201 and the server may be or include, for example, an electronic mail (e-mail) application program for the communication of e-mail messages.

Also, wireless device 201 may be additionally configured to access communication services via a Public Land Wireless Network (PLMN) 136 (e.g. a cellular telecommunications network), other type of wireless wide area network (WWAN). PLMN 136 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 136. For communication with PLMNs, wireless device 201 may be configured in accordance with one or more cellular telecommunication standards, such as Global Systems for Mobile (GSM) and/or General Packet Radio Service (GPRS) technologies. Such wireless device may additionally or alternatively operate in accordance with other such cellular standards, such as Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples, or even wireless broadband standards such as IEEE 802.16 (WiMAX), IEEE 802.20 and IEEE 802.22.

In addition to being operative for communications with infrastructure WLANs (e.g. IEEE 802.11 infrastructure WLANs), wireless device 201 additionally or alternatively communicates using peer-to-peer communication techniques, for example, in accordance with the Wi-Fi Peer-To-Peer (P2P) Technical specification, and/or be certified as a "Wi-Fi Direct" device. Accordingly, illustrating further in FIG. 1, wireless device 201 and one or more other wireless devices 195 and 197 in FIG. 1 may be operative to establish Wi-Fi P2P network connections with each other in a Wi-Fi P2P network. Here, one of the communicate devices may be configured to enter into an AP mode of operation, so that other communication devices may associate with them for direct RF communications therebetween. An AP mode of operation, which may be referred to as a "wireless AP mode" or the like, provides a benefit due to the high data rates available over WLAN links. Here, again, data may be communicated directly between the wireless devices without the data traversing any wireless network infrastructure, where one of the devices is set to operate or serve as an AP (switching operation from as an end terminal) and the other device operates as an end terminal to associate and connect with the AP (i.e. wireless device 201 operating as an AP) for communications. Wireless device 201 may operate such that, when in the AP mode of operation with other communication devices 195 and 197, it also operates as a client with another AP.

Figure 2:
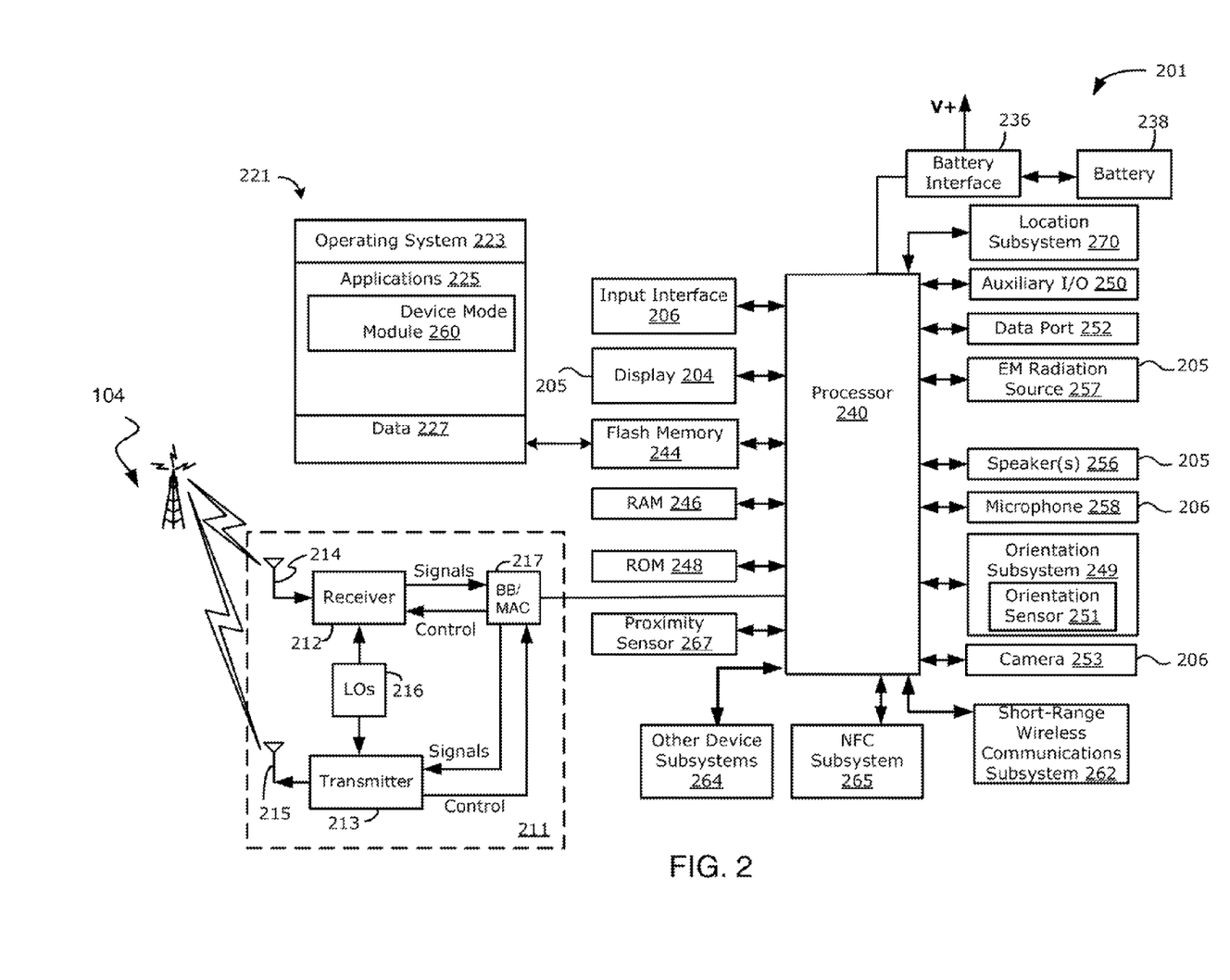
FIG. 2 is an example of a schematic block diagram of a wireless communication device.

Reference will now be made to FIG. 2 which illustrates one example of a schematic block diagram of wireless device 201. In the illustrated example, wireless device 201 is a communication device and, more particularly, is a mobile communication device having data and voice communication capabilities, and configured to communicate with other computer systems (e.g., via the Internet). It will, however, be appreciated that wireless device 201 may take other forms. Depending on the functionality provided by wireless device 201, in various examples, wireless device 201 may be a multiple-mode communication device configured for both data and voice communication, a mobile telephone, such as a smartphone, a wearable computers such as a watch, a tablet computer such as a slate computer, a personal digital assistant (PDA), or a computer system. Wireless device 201 may take other forms apart from those specifically listed above. The electronic device may also be referred to as a mobile communications device, a communication device, a mobile device, a station (e.g. a STA), and, in some cases, as a device.

Wireless device 201 includes a controller including one or more processors 240 (such as a microprocessor) which controls the overall operation of wireless device 201. The processor 240 interacts with device subsystems such as a wireless communication subsystem 211 for exchanging radio frequency signals with wireless network 104 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range wireless communication subsystem 262 and other device subsystems generally designated as 264. Some of the subsystems shown in FIG. 2 perform communication-related functions, whereas other subsystems may provide "resident" or on-device functions.

In at least some embodiments, wireless device 201 may include a touchscreen display which acts as both an input interface 206 (i.e., touch-sensitive overlay) and an output interface 205 (i.e., display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some embodiments, the touch-sensitive overlay may have a touch-sensitive input surface which is larger than the display 204. For example, the touch-sensitive overlay may extend overtop of a frame 312 (of FIG. 3) which surrounds the display 204. In such example, the frame 312 (of FIG. 3) may be referred to as an active frame since it is capable of acting as an input interface 206. In at least some embodiments, the touch-sensitive overlay may extend to the sides of wireless device 201.

As noted above, in some embodiments, wireless device 201 may include a communication subsystem 211 which allows wireless device 201 to communicate over wireless network 104. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to wireless device 201 and a single antenna may be shared by both receiver and transmitter. The particular design of the wireless communication subsystem 211 depends on wireless network 104 in which wireless device 201 is intended to operate.

In at, least some embodiments, wireless device 201 may communicate with any one of a plurality of stations (STAB) or access points (APs) of wireless network 104 within its geographic coverage area. Wireless device 201 may send and receive communication signals over wireless network 104 after the required network registration or activation procedures have been completed. Signals received by the antenna 214 through wireless network 104 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to wireless network 104 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some embodiments, the auxiliary input/output (I/O) subsystems 250 may include an external communication link or interface; for example, an Ethernet connection. Wireless device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on wireless device 201 such as receipt of an electronic communication or incoming phone call, or for other purposes such as haptic feedback (touch feedback).

The data port 252 may be used for synchronization with a user's host computer system (not shown). The data port 252 enables a user to set preferences through an external device or software application and extends the capabilities of wireless device 201 by providing for information or software downloads to wireless device 201 other than through wireless network 104. The alternate download path may for example, be used to load an encryption key onto wireless device 201 through a direct, reliable and trusted connection to thereby provide secure device communication.

In at least some embodiments, wireless device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some embodiments, the orientation sensor 251 is an accelerometer, such as a three-axis accelerometer. An accelerometer is a sensor which converts acceleration from motion (e.g., movement of the device 201 or a portion thereof due to the strike force) and gravity which are detected by a sensing element and converted into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of wireless device 201. The orientation data, in at least some embodiments, specifies the orientation of the device 201 relative to the gravitational and magnetic fields of the earth.

The orientation subsystem 249 may include other orientation sensors 251, instead of or in addition to accelerometers. For example, the orientation subsystem 249 may include a gravity sensor, a gyroscope, a tilt sensor, an electronic compass or other suitable sensor, or combinations thereof. In some embodiments, the device orientation subsystem 249 may include two or more orientation sensors 251 such as an accelerometer and an electronic compass.

Wireless device 201 may, in at least some embodiments, include a near field communications (NFC) subsystem 265. The NFC subsystem 265 is configured to communicate with other wireless devices 201 and/or tags, using an NFC communications protocol. NFC is a set of short-range wireless technologies which typically require a distance of 4 cm or less for communications. The NFC subsystem 265 may include an NFC chip and an NFC antenna.

Wireless device 201 may include a microphone and/or one or more speakers. In at least some embodiments, wireless device 201 may include a plurality of speakers 256. For example, wireless device 201 may include two or more speakers 265. The two or more speakers 256 may, for example, be disposed in spaced relation to one another. That is, in at least some embodiments, wireless device 201 may include a first speaker and a second speaker and the first speaker and the second speaker may be spatially separated from one another within wireless device 201. The display 204 may be disposed between the first speaker and the second speaker of the electronic device. In such example, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some embodiments, each speaker 256 may be associated with a separate audio channel. The multiple speakers may, for example, be used to provide stereophonic sound (which may also be referred to as stereo).

Wireless device 201 may also include one or more cameras 253. The one or more cameras 253 may be capable of capturing images in the form of still photographs or motion video. In at least some embodiments, wireless device 201 includes a front facing camera 253. A front facing camera 253 is a camera which is generally located on a front face of wireless device 201. The front face is typically the face on which a display 204 is mounted. That is, the display 204 is configured to display content which may be viewed from a side of wireless device 201 where the camera 253 is directed. The front facing camera 253 may be located anywhere on the front surface of the electronic device; for example, the camera 253 may be located above or below the display 204. Alternatively, or additionally, camera 253 may be located on a rear face of wireless device 201. The camera 253 may be a fixed position camera which is not movable relative to the display 204 of wireless device 201 and/or the housing of wireless device 201. In such embodiments, the direction of capture of the camera is always predictable relative to the display 204 and/or the housing. In at least some embodiments, the camera may be provided in a central location relative to the display 204 to facilitate image acquisition of a face.

In at least some embodiments, wireless device 201 includes an electromagnetic (EM) radiation source 257. An EM radiation source 257 is configured to emit electromagnetic radiation from the side of the electronic device which is associated with a camera 253 of that wireless device 201. For example, where the camera is a front facing camera 253, wireless device 201 may be configured to emit electromagnetic radiation from the front face of wireless device 201. That is, the electromagnetic radiation source 257 is configured to emit radiation in a direction which may visible by the camera. That is, the camera 253 and the electromagnetic radiation source 257 may be disposed on wireless device 201 so that electromagnetic radiation emitted by the electromagnetic radiation source 257 is visible in images obtained by the camera.

In some embodiments, the electromagnetic radiation source 257 may be an infrared (IR) radiation source which is configured to emit infrared radiation. The electromagnetic radiation source 257 may be configured to emit radiation which is not part of the visible spectrum. The camera 253 may be a camera which is configured to capture radiation of the type emitted by the electromagnetic radiation source 257. Accordingly, in at least some embodiments, the camera 253 is configured to capture at least some electromagnetic radiation which is not in the visible spectrum.

Also in some embodiments, wireless device 201 is provided with a service routing application programming interface (API) which provides an application with the ability to route traffic through a serial data (i.e., USB) or BLUETOOTH® (BLUETOOTH® is a registered trademark of Bluetooth SIG, Inc.) connection to a host computer system using standard connectivity protocols. When a user connects their wireless device 201 to the host computer system via a USB cable or BLUETOOTH® connection, traffic that was destined for wireless network 104 is automatically routed to wireless device 201 using the USB cable or BLUETOOTH® connection. Similarly, any traffic destined for wireless network 104 is automatically sent over the USB cable BLUETOOTH® connection to the host computer system for processing.

Wireless device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in wireless device 201, and the battery interface 236 provides a mechanical and electrical connection for the battery 238. The battery interface 236 is coupled to a regulator (not shown) which provides a regulated voltage V to the circuitry for powering wireless device 201.

Wireless device 201 includes a short-range communication subsystem 262 which provides for wireless communication between wireless device 201 and other wireless devices 201. The short-range communication subsystem 262 may be used to provide a preferred device mode between wireless device 201 and another wireless device 201 which may, in at least some embodiments, be a wireless device which is the same or similar to wireless device 201 discussed with reference to FIG. 1. The short-range communication subsystem 262 may be a wireless bus protocol compliant communication mechanism such as a BLUETOOTH® communication module to provide for communication with similarly-enabled systems and devices.

Wireless device 201 stores data 227 in an erasable persistent memory, which in one example is the flash memory 244. In some embodiments, the data 227 includes service data including information required by wireless device 201 to establish and maintain communication with wireless network 104. The data 227 may also include user application data such as email messages, address book and contact information, calendar and schedule information, notepad documents, image files, and other commonly stored user information stored on wireless device 201 by its user, and other data. The data 227 stored in the persistent memory (e.g., flash memory 244) of wireless device 201 may be organized, at least partially, into one or more databases or data stores. The databases or data stores may contain data items of the same data type or associated with the same application. For example, email messages, contact records, and task items may be stored in individual databases within the device memory.

Wireless device 201 may, in some embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of wireless device 201 may also compose data items, such as email messages; for example, using the input devices in conjunction with the display 204. These composed items may be transmitted through the communication subsystem 211 over wireless network 104.

In the voice communication mode, wireless device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on wireless device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 2, the software modules 221 include operating system software 223 and other software applications 225 such as device mode module 260. In the example of FIG. 2, the device mode module 260 is implemented as a stand-alone application 225. However, in other embodiments, the device mode module 260 could be implemented as part of the operating system 223 or another application 225.

The software applications 225 on wireless device 201 may also include a range of additional applications, including for example, a notepad application, Internet browser application, voice communication (i.e., telephony) application, mapping application, or a media player application, or any combination thereof. Each of the software applications 225 may include layout information defining the placement of particular fields and graphic elements (e.g., text fields, input fields, icons, etc.) in the user interface (e.g., the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on wireless device 201 during or after manufacture. Additional applications and/or upgrades to the operating system 223 or software applications 225 may also be loaded onto wireless device 201 through wireless network 104, the auxiliary I/O subsystem 250, the data port 252, the short-range communication subsystem 262, or other suitable subsystem 264. The downloaded programs or code modules may be permanently installed; for example, written into the program memory (i.e., the flash memory 244), or written into and executed from the RAM 246 for execution by the processor 240 at runtime.

Example Smartphone Electronic Device.

Figure 3:
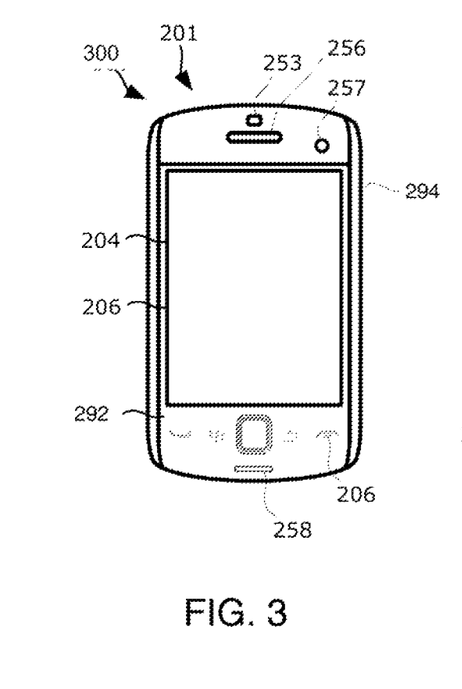
FIGS. 3 and 4 are some examples of different types of wireless devices of the present disclosure, which include a smartphone (FIG. 3) and a tablet computer (FIG. 4)

Referring now to FIG. 3, a front view of an example wireless device 201 which is a smartphone 300 is illustrated. The smartphone 300 is a mobile phone which offers more advanced computing capability than a basic non-smartphone cellular phone. For example, the smartphone 300 may have the ability to execute third party applications which are stored on the smartphone.

The smartphone 300 may include the components discussed above with reference to FIG. 2 or a subset of those components. The smartphone 300 includes a housing 294 which houses at least some of the components discussed above with reference to FIG. 2.

In the example illustrated, the smartphone includes a display 204, which may be a touchscreen display which acts as an input interface 206. The display 204 is disposed within the smartphone 300 so that it is viewable at a front side 292 of the smartphone 300. That is, a viewable side of the display 204 is disposed on the front side 292 of the smartphone. In the example illustrated, the display 204 is framed by the housing 294.

The example smartphone 300 also includes other input interfaces 206 such as one or more buttons, keys or navigational input mechanisms. In the example illustrated, at least some of these additional input interfaces 206 are disposed for actuation at the front side 292 of the smartphone.

The example smartphone also includes a speaker 256. In the example illustrated, the smartphone includes a single speaker 256 which is disposed vertically above the display 204 when the smartphone 300 is held in a portrait orientation where its height is longer than its width. The speaker 256 may be disposed on the front face of the smartphone 300.

While the example smartphone 300 of FIG. 3 includes a single speaker 256, in other examples, the smartphone 300 may include a greater number of speakers 256. In at least some embodiments, the smartphone 300 may include a second speaker 256 which is disposed vertically below the display 204 when the smartphone is held in a portrait orientation where its height is longer than its width (i.e., the orientation illustrated in FIG. 3).

The example smartphone 300 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 300 also includes a front facing camera 253 which may be located vertically above the display 204 when the smartphone 300 is held in a portrait orientation where its height is longer than its width. The front facing camera 253 is located so that it may capture images of objects which are located in front of and/or surrounding the front side of the smartphone 300.

The example smartphone 300 also includes an electromagnetic radiation source 257. The electromagnetic radiation source 257 is disposed on the front side 292 of the smartphone 300. In this orientation, electromagnetic radiation which is produced by the electromagnetic radiation source 257 may be projected onto objects which are located in front of and/or surrounding the front side of the smartphone 300. Such electromagnetic radiation (or the projection of electromagnetic radiation onto objects) may be captured on images obtained by the camera 253.

Example Tablet Electronic Device.

Figure 4:
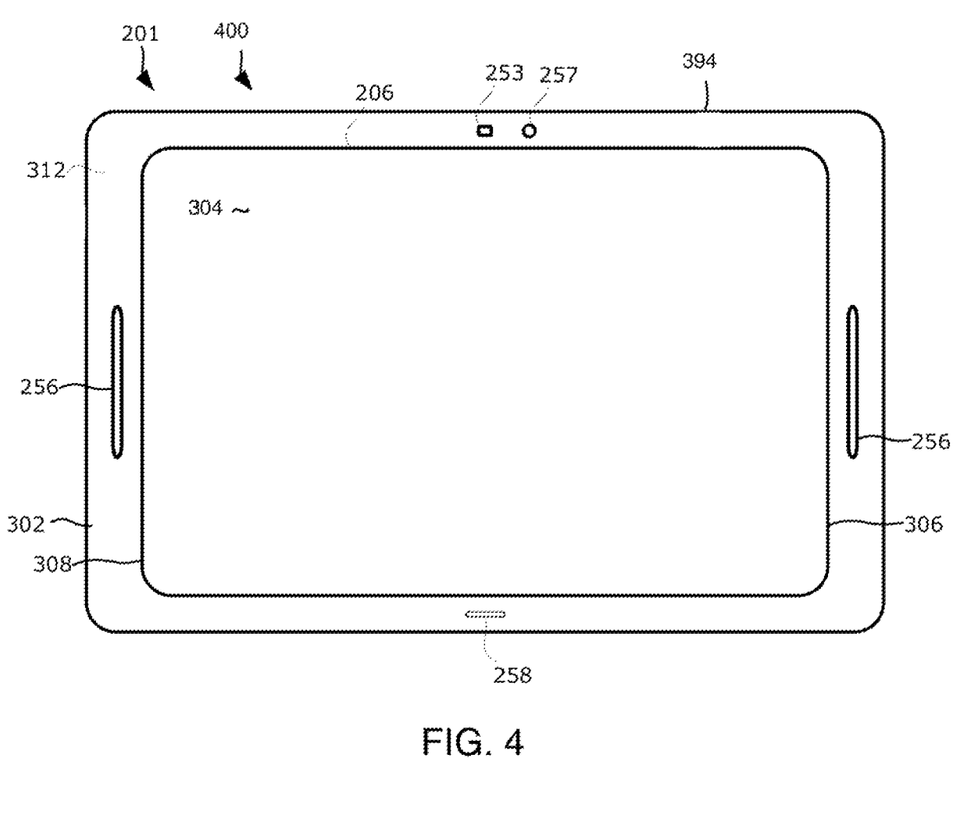

The wireless device may be a tablet computer 400 ("tablet"), one of which is illustrated in FIG. 4. Tablet computer 400 of FIG. 4 may include many of the same features and components of the smartphone 300 of FIG. 3. However, tablet computer 400 of FIG. 4 is generally larger than the smartphone 300 of FIG. 3. Tablet computer 400 may include the components discussed above with reference to FIG. 2 or a subset of those components. Tablet computer 400 includes a housing 394 which houses at least some of the components discussed above with reference to FIG. 2.

Tablet computer 400 includes a display 304, which may be a touchscreen display which acts as an input interface 206. The display 304 is disposed within tablet computer 400 so that it is viewable at a front side 302 of tablet computer 400. That is, a viewable side of the display 304 is disposed on the front side 302 of tablet computer 400. In the example illustrated, the display 304 is framed by the housing 394, with use of a frame 312 which surrounds the display 304. The frame 312 is portion of the housing 394 which provides a border around the display 304. In at least some embodiments, the frame 312 is an active frame 312. That is, the frame has a touch sensitive overlay which allows wireless device 201 to detect a touch applied to the frame, thereby allowing the frame 312 to act as an input interface 206 (of FIG. 2).

The example tablet computer 400 includes a plurality of speakers 256. In the example illustrated, the tablet includes two speakers 256. The two speakers 256 are disposed on opposing sides of the display 304. More particularly, when tablet computer 400 is held in a landscape orientation (such as the orientation illustrated in FIG. 4) where its width is longer than its height, one of the two speakers is disposed on a right side 306 of the display 304 and one of the speakers is disposed on the left side 308 of the display 304. Both speakers 256 are disposed on the front side 302 of tablet computer 400.

The example tablet computer 400 also includes a microphone 258. In the example illustrated, the microphone 258 is vertically disposed below the display 304 when the tablet computer is held in the landscape orientation illustrated in FIG. 4. On the other hand, the microphone 258 may be located in other locations.

The example tablet computer 400 also includes a front facing camera 253 which may be located vertically above the display 304 when tablet computer 400 is held in a landscape orientation (i.e., the orientation of FIG. 3). The front facing camera 253 is located so that it may capture images of objects which are located in front of and/or surrounding the front side of tablet computer 400.

The example tablet computer 400 also includes an electromagnetic radiation source 257. The electromagnetic radiation source 257 is disposed on the front side 304 of tablet computer 400. In this orientation, electromagnetic radiation which is produced by the electromagnetic radiation source 257 may be projected onto objects which are located in front of and/or surrounding the front side 302 of tablet computer 400. Such electromagnetic radiation (or the projection of electromagnetic radiation onto objects) may be captured on images obtained by the camera 253.

Although a specific wireless device has just been described, any suitable wireless communication device or terminal may be part of the methods and apparatus which will be described in fuller detail below. Also, although the description of the architecture relates to a specific example for illustration, where the wireless network or WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

Example Wireless Network Configurations/Connections.

Figure 5:
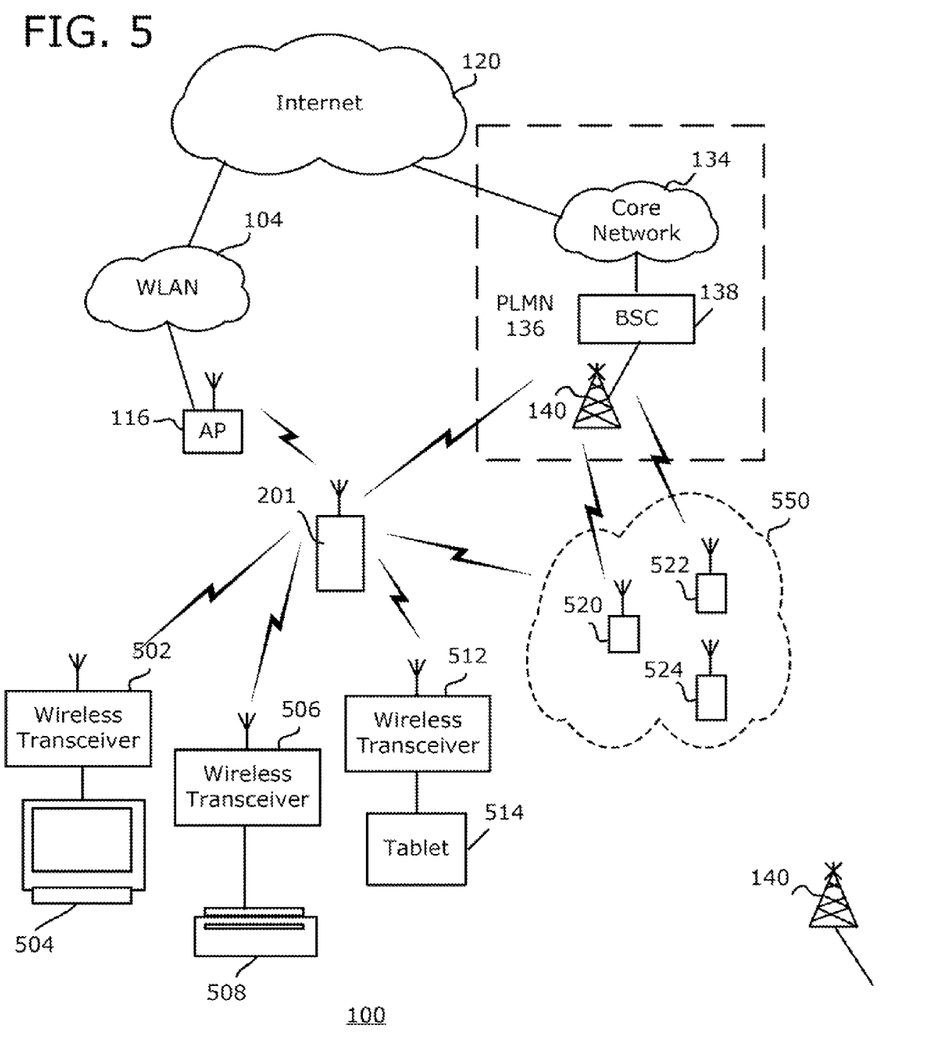
FIG. 5 is an illustration representation of a part of the communication system of FIG. 1 with different types of wireless networks, including different types of wireless Peer-to-Peer (P2P) networks associated with different applications.

FIG. 5 is an illustrative representation of a part of the communication system 100 of FIG. 1, which illustrates different types of wireless network configurations which may involve wireless device 201. Wireless networks 104 and 122 are WLANs of the traditional "WLAN infrastructure" type, which typically provide for external network connectivity, as described earlier in relation to FIG. 1. For example, wireless networks 104 and 122 are configured to provide or facilitate access to the Internet 120 (or other communication network, such as a public communication network) for wireless device 201 when connected therewith. In this case, wireless device 201 may make use of its WLAN profiles for connecting with such WLANs.

Other wireless networking configurations include Wi-Fi Peer-to-Peer (P2P) networking configurations. For example, in FIG. 5 it is shown that wireless device 201 may establish a Wi-Fi P2P wireless connection with a display device 504 (or monitor) which includes a wireless transceiver 502. Such Wi-Fi P2P network connection may be suitable for applications such as, for example, a streaming media application, or a display or presentation application.

It is also shown that wireless device 201 may establish a Wi-Fi P2P network connection with a printer device 508 which includes a wireless transceiver 506. Such Wi-Fi P2P network connection may be suitable for applications such as, for example, a print application or a facsimile application.

Even further, it is shown that wireless device 201 may establish a Wi-Fi P2P network connection with a tablet 514 which includes a wireless transceiver 512. An example tablet was previously shown and described in relation to FIG. 4. Such Wi-Fi P2P network connection may be suitable for an application such as, for example, a bridge or bridging application, where wireless device 201 is further configured for cellular telecommunications (e.g. equipped with a cellular transceiver) but tablet 514 is not. Here, wireless device 201 may operate or be referred to as a "mobile hotspot." In such an application, tablet 514 is able to achieve connectivity to an external network (e.g. Internet), being connected to wireless device 201 for communications via the cellular telecommunication network.

Similarly, wireless device 201 may be configured to establish peer-to-peer network connections in a wireless peer-to-peer network (Wi-Fi P2P network) which includes one or more other wireless devices 520, 522, and 524. Again, these networks may or may not provide for connectivity to an external network such as the Internet.

Profiles for Applications which Make Use of Wi-Fi P2P Wireless Connections.

As described earlier, wireless device 201 has different types of applications stored therein. These applications may include, as examples, a Web browsing application, a messaging application, a voice telephony application, a streaming media application, a file sharing application, a game application, a printer application, a facsimile application, a display or presentation application, a military application, as examples. Wireless device 201 is optimized to establish the appropriate wireless networks based on which type of application is invoked.

Figure 6:
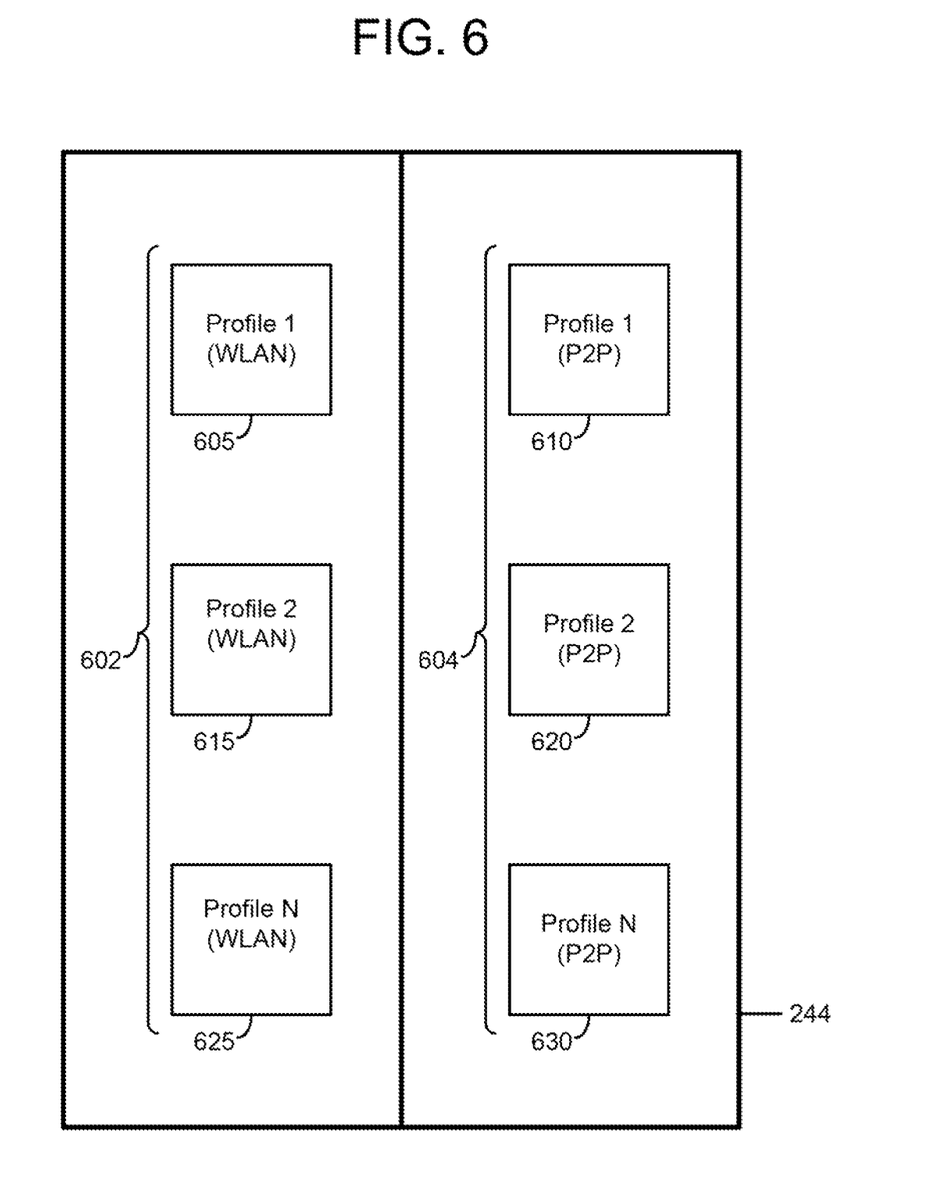
FIG. 6 is an illustrative representation of a portion of memory which includes a plurality of profiles, including profiles associated with applications and/or services which may make use of WLAN profiles, Wi-Fi P2P profiles, or both.

Referring ahead to FIG. 6, an illustrative representation of another portion of memory 244 of wireless device 201 is shown. Memory 244 is shown to store a plurality of profiles for wireless networking. The profiles include one or more profiles 602 associated with WLAN infrastructure networks, and/or one or more profiles 604 associated with applications and/or services which utilize Wi-Fi P2P network connections. In FIG. 6, profiles 602 are shown to include profiles 605, 615, and 625, whereas profiles 604 are shown to include profiles 610, 620, and 630. Profiles 602 may be or be referred to as WLAN profiles, whereas profiles 604 may be or be referred to as Wi-Fi P2P networking profiles or Wi-Fi Direct profiles.

Each one of profiles 602 is associated with a particular WLAN infrastructure network, and includes a plurality of parameters and/or properties for accessing the particular WLAN. The WLAN information may include an identification which identifies the WLAN (e.g. a SSID or HESSID). The WLAN information may also include authentication and/or security information for obtaining access to the WLAN (e.g. a network key, passkey, security key, etc.). One of the WLANs appropriate WLAN from profiles 602 will be selected for communication when available, as prioritized in a prioritized list of the profiles 602. When not connected in a WLAN, the wireless device normally operates to search for WLANs identified in its stored profiles 602. Conversely, the wireless device normally refrains from searching for and communicating in WLANs other than those WLANs identified in stored profiles 602.

On the other hand, each one of profiles 604 is associated with one of the applications and/or services which utilize a particular type and/or configuration of Wi-Fi P2P network (or Wi-Fi Direct network). Each one of profiles 604 includes parameters and/or properties associated with establishing the particular type and/or configuration of Wi-Fi P2P network for the application and/or service. Profiles 604 may be created, viewed, updated, enabled, and disabled.

Properties in profiles 604 may include a device type property which indicates a type of the device for the Wi-Fi P2P network connection to be established. The device type may be the type of device that is being searched for in the discovery. Note that there may be two device types specified in the profile: a primary device type and a secondary device type. The device types may be or include the appropriate device types in the Wi-Fi Direct network as described in the Wi-Fi Peer-To-Peer (P2P) Technical specification (e.g. in Annex B thereof). The device types may be or include the predefined values as set forth therein. The device type may be or include category identification (ID) and/or subcategory identification (ID). Examples of such device types are as follows: a computer, an input device, a printer, a camera, a display (monitor), a gaming device, an audio device, a multimedia device, or a telephone device.

Properties may additionally or alternatively include an advertised device type property which indicates the type of device of wireless device 201. The advertised device type may be the type of device to be advertised by wireless device 201. Note that there may be two advertised device types specified in the profile: a primary advertised device type, and a secondary advertised device type. The advertised device types may be or include the appropriate device types in the Wi-Fi Direct network as described in the Wi-Fi Peer-To-Peer (P2P) Technical specification (e.g. in Annex B thereof). The device types may be or include the predefined values as set forth therein. The advertised device type may be or include category identification (ID) and/or subcategory identification (ID). Examples of such device types are as follows: a computer, an input device, a printer, a camera, a display (monitor), a gaming device, an audio device, a multimedia device, or a telephone device.

Properties in profiles 604 may additionally or alternatively include a service type property which indicates a type of service which identifies the service associated with the device. For example, the service types may be or include the appropriate service types as described in the Wi-Fi Peer-To-Peer (P2P) Technical specification (e.g. in Annex E thereof). Examples of such types are as follows: a file sharing service, or a printing service. Alternatively, examples of such types are as follows: Apple File Sharing (AFP) service (or AFP over TCP service), or IP Printing (IPP) Bonjour service.

Properties in profiles 604 may additionally or alternatively include a discovery mode property which indicates a mode utilized for the discovery of devices for the Wi-Fi P2P network connection. The discovery mode property may be set to one of the following: a triggered mode of discovery, or a periodic mode of discovery. Alternatively, the discovery mode may be set to one of the following: a triggered mode of discovery, a periodic mode of discovery, or a Group Owner (GO) mode of discovery.

Properties in profiles 604 may additionally or alternatively include a persistent property or indication which indicates whether or not the Wi-Fi P2P network is persistent. If the network is persistent, when an application is opened or activated, the wireless device connects to a previously-established Wi-Fi P2P network.

Properties in profiles 604 may additionally or alternatively include a coexistence indication or property which indicates whether the Wi-Fi P2P network connection associated with this profile may be maintained while the wireless device operates as a client in an infrastructure network. Properties may additionally or alternatively include another coexistence indication or property which indicates whether the Wi-Fi P2P network connection associated with this profile may be maintained while maintaining another Wi-Fi P2P network connection.

Properties in profiles 604 may additionally or alternatively include an application name is the name of the application associated with the profile. Relatedly, properties in profiles 604 may additionally or alternatively include an application link or address pointer to the application in memory of the wireless device.

Figure 7:
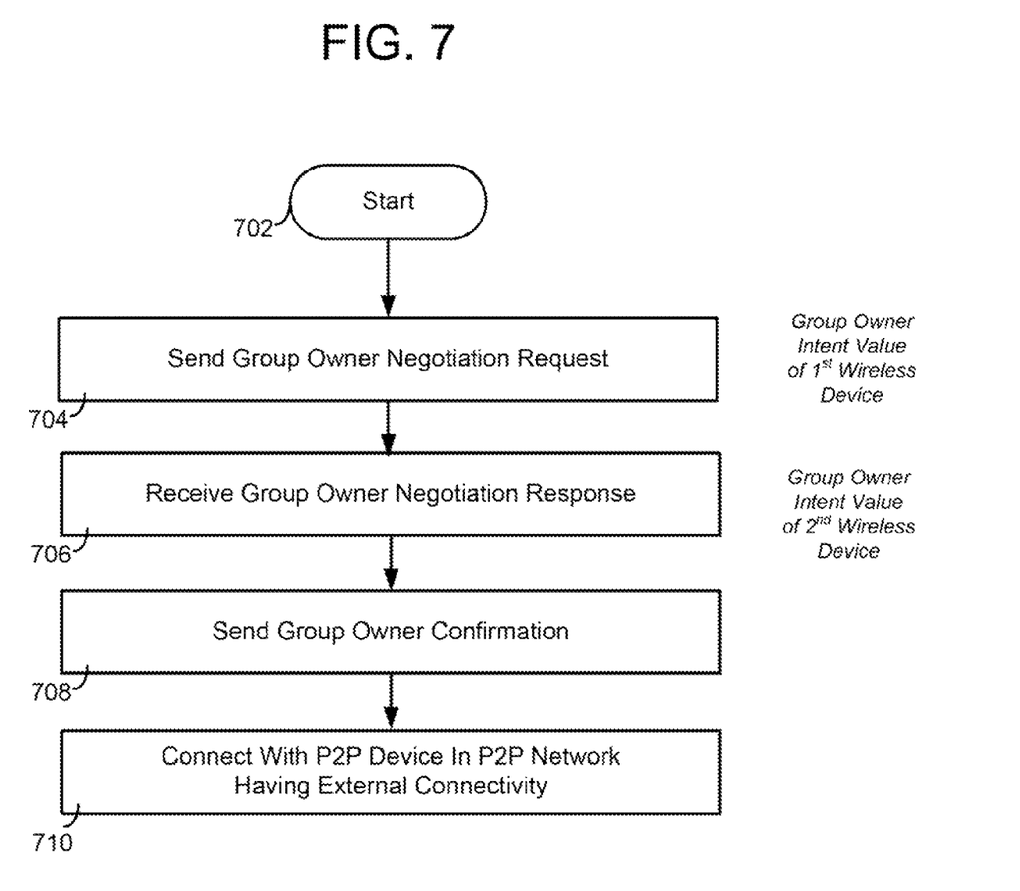
FIG. 7 is a flowchart for describing a method for use in negotiating a group owner in a wireless P2P network.

FIG. 7 is a flowchart which describes a method for use in negotiating a group owner with another wireless device in a wireless Peer-to-Peer (P2P) network having a connection to an external network. The methods may be performed by wireless device 201 described in relation to FIGS. 1-6. In particular, the techniques described may be performed by one or more controllers or processors of the wireless device along with its wireless or RF transceivers. The wireless device may operate in accordance with protocols described in the Wi-Fi Peer-To-Peer (P2P) Technical specification. The wireless device may or may not be configured to operate as a mobile hotspot or include mobile hotspot functionality. The wireless device may include a first wireless transceiver configured for communications in a wireless peer-to-peer (P2P) network, and a second wireless transceiver configured for communications via a wireless (e.g. cellular) network. A computer program product which may embody the technique may include a computer readable medium (e.g. memory of the communication device, computer disk, CD-ROM, etc.) having computer instructions stored therein which are executable by the one or more processors of the wireless device for performing the technique.

In FIG. 7, the wireless device generally operates to perform functions for group formation, and specifically for negotiating a group owner in a P2P network. The group formation may be for the purpose of communicating over a data connection via a wireless network (e.g. a cellular network) to an external network (e.g. the Internet). For example, the group formation may be for communications with a "mobile hotspot" for communications via the Internet.

Beginning at a start block 702, the wireless device produces and sends a group owner negotiation request to another wireless device (step 704 of FIG. 7). The group owner negotiation request includes a group owner intent value (or "intent") of the wireless device to become the group owner in the Wi-Fi P2P network. The group owner intent value or "intent" may be a value within a range of 0 to 15. The group owner intent value may be determined based on the flowchart of FIG. 8, which is described later below.

The other wireless device receives this group owner negotiation request and, in response, produces and sends to the wireless device a group owner negotiation response. Accordingly, the wireless device receives a group owner negotiation response from the other wireless device (step 706 of FIG. 7). The group owner negotiation response includes a group owner intent value (or "intent") of the other wireless device to become the group owner in the Wi-Fi P2P network. The group owner intent value or "intent" may be a value within a range of 0 to 15. Again, the group owner intent value may be determined based on the flowchart of FIG. 8, which is described later below.

The group owner is then determined based on the group owner intent values of the wireless devices. For example, the group owner may be determined to be the wireless device having a group owner intent value that is greater than the group owner intent value of the other wireless device.

The wireless device then produces and sends a group owner confirmation to the wireless device (step 708 of FIG. 7). Thereafter, the wireless devices may establish a Wi-Fi P2P network, where one of the devices is the group owner with external connectivity (step 710 of FIG. 7). The wireless devices may communicate over the data connection via the wireless network to the external network. Here, the group owner may operate as a mobile hotspot so that the one or more other wireless devices may access the Internet via the wireless network.

Figure 8:
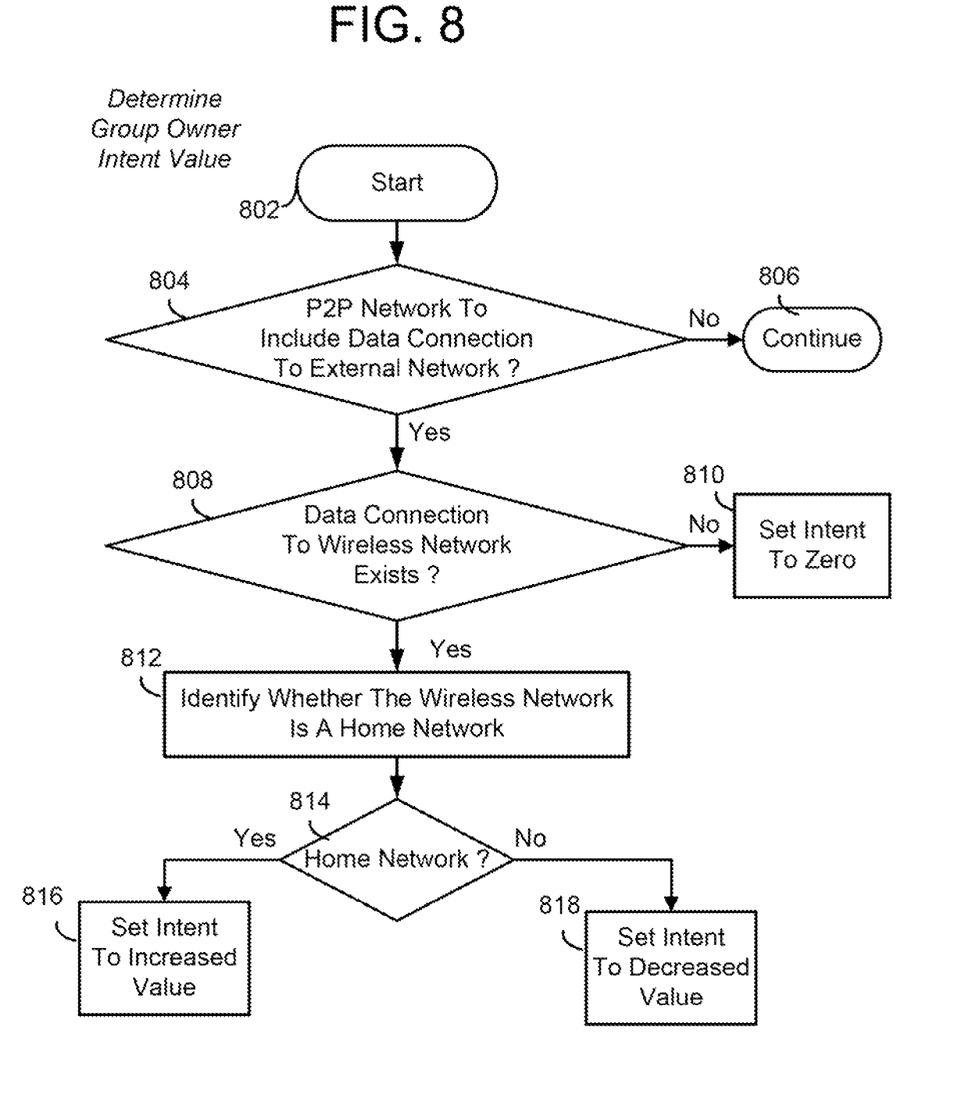
FIG. 8 is a flowchart for describing a method for use in determining a group owner intent value for use in negotiating the group owner in FIG. 7.

FIG. 8 is a flowchart for describing a method for use in determining a group owner intent value for use in negotiating the group owner in FIG. 7. The method may be performed by wireless device 201 described in relation to FIGS. 1-7. The wireless device may operate in accordance with protocols described in the Wi-Fi Peer-To-Peer (P2P) Technical specification. The techniques described may be performed by the one or more controllers or processors of the wireless device along with its wireless or RF transceivers. The wireless device may or may not be configured to operate as a mobile hotspot or include mobile hotspot functionality. The wireless device may or may not be configured to operate as a mobile hotspot. The wireless device may include a first wireless transceiver configured for communications in a wireless peer-to-peer (P2P) network, and a second wireless transceiver configured for communications via a wireless (e.g. cellular) network. A computer program product which may embody the technique may include a computer readable medium (e.g. memory of the communication device, computer disk, CD-ROM, etc.) having computer instructions stored therein which are executable by the one or more processors of the wireless device for performing the technique.

With respect to FIG. 8 generally, the wireless device operates to perform functions for group formation, and specifically for determining its group owner intent value for the negotiation of a group owner in a Wi-Fi P2P network. The group owner intent value or "intent" may be a value within a range of 0 to 15. Upon group formation, the wireless device will communicate in the network with use of its first wireless transceiver (e.g. its WLAN transceiver operative in accordance with IEEE 802.11). If the wireless device becomes the group owner, it will operate to route data communications for the one or more other connected wireless devices over a data connection established via a wireless network with use of its second wireless transceiver (e.g. its cellular transceiver in communications with a cellular telecommunications network).

Beginning at a start block 802 of FIG. 8, the wireless device identifies whether the request for the group formation indicates or relates to a need, a desire, or a preference to have a data connection to an external network (step 804 of FIG. 8). The external network may be any suitable communication network that is external to the network being formed. The external network may be a public communication network, such as the Internet. The data connection may involve packet data communications, where the identification in step 804 may involve identifying whether the wireless device has a packet data service established with the wireless network. The need, desire, or preference to have the data connection to the external network may be explicit or implicit. The request may, for example, indicate a need, desire, or preference to establish communications with a mobile hotspot for communications via the Internet.

If the connection to the external network is not needed, desired, or preferred, as identified in step 804, then processing continues based on other considerations (step 806 of FIG. 8), where steps 808-818 of FIG. 8 are bypassed.

Otherwise, if the data connection to the external network is needed, desired, or preferred, as identified at step 804, then the wireless device identifies whether it currently has (or is able to currently obtain) a data connection with a wireless network (step 808 of FIG. 8). The wireless network may be a cellular telecommunications network, such as a public land mobile network (PLMN) or the like. The wireless device may communicate with a wireless network with use of a second wireless transceiver, which may be a cellular radio transceiver for communications with a cellular telecommunications network.

If the wireless device identifies that it does not have (or is unable to obtain) a data connection with a wireless network in step 808, then the wireless device sets its group owner intent value to zero (0) (step 810 of FIG. 8). In this case, the wireless device may not be registered with any suitable wireless network for data service. Accordingly, the wireless device will set its group owner intent value to zero (0) because it will not be able to serve as the group owner for the purposes of routing data communications for one or more other wireless devices over a data connection via a wireless network. The wireless device may not currently have or be unable to currently obtain a data connection with a wireless network for a variety of different reasons, such as being out-of-coverage with any suitable wireless network, not having a valid subscription for services with any suitable wireless network, not having a second wireless transceiver for communications via a wireless network, etc.

If the wireless device identifies that it does currently have (or is able to currently obtain) a data connection with a wireless network in step 808 (e.g. it is currently registered with a suitable wireless network for data service), then the wireless device identifies whether the wireless network is a home network or a non-home network (step 812 of FIG. 8). A home network may be a network that is owned and/or affiliated with (e.g. through agreement or contract) the carrier for which the user has obtained a subscription for communication services. A non-home network is not a home network, and may be or be referred to as a visiting network. A home network may have preferred or better services than those made available by a non-home network, and/or may make services available at a cost that is lower than the cost of the services in a non-home network (e.g. where the wireless device is roaming).

In this step 812, the wireless device may maintain storage of a list of one or more home network identifiers in its memory. The wireless device may receive a network identifier which identifies the wireless network with which it is registered, and compare this received network identifier with the one or more home network identifiers stored in memory. If there is a match between the received network identifier and any one of the home network identifiers, then the wireless network is identified to be its home network. Otherwise, if the received network identifier fails to match any of its home network identifiers, then the wireless network is identified to be a non-home network.

Additionally or alternatively, the wireless device may maintain in its memory an indicator of whether or not it is currently registered with a home network. Upon registration with a wireless network, the wireless device will set the indicator in memory as "non-home network" (e.g. set bit indicator to "0") or "home network" (e.g. set bit indicator to "1"). In step 812, the wireless device merely tests the stored indicator to identify whether the current wireless network is a home network or a non-home network.

The network identifiers may be or include network identifiers of cellular networks, or PLMNs, which are identified by Mobile Country Code (MCC) and Mobile Network Code (MNC) pairs, for example. Here, the one or more home networks may be stored in memory as one or more Home PLMN (HPLMN) identifiers, for example, in an HPLMN list. Also, non-home networks may be any networks not identified as the stored HPLMN identifier or in the HPLMN list, and/or be identified in a preferred PLMN (PPLMN) list of the wireless device.

If the wireless device identifies that the wireless network is a home network (step 814 of FIG. 8), then the wireless device may set its group owner intent value to an increased value (step 816 of FIG. 8). On the other hand, if the wireless device identifies that the wireless network is a non-home network in step 814, then the wireless device may set its group owner intent value to decreased value (step 816 of FIG. 8).

Step 816 may involve increasing a previous nominally set value to obtain an increased value, whereas step 818 may involve decreasing the previous nominally set value to obtain a decreased value. Alternatively, step 816 may involve increasing the previous nominally set value to obtain an increased value, whereas step 818 may involve maintaining the same previous nominally set value as previously set. Also alternatively, step 816 may involve maintaining the same previous nominally set value as previously set, whereas step 818 may involve decreasing the previous nominally set value to obtain a decreased value. In any case, the resulting value from step 816 (operating in home network) will be greater than the resulting value set in step 818 (operating in non-home network), where the wireless device indicates a greater intent to become the group owner when operating in a home network.

The wireless device then sends to the other wireless device a message which includes its group owner intent value (see e.g. the discussion in relation to FIG. 7). For example, the group owner intent value may be included as a Peer-to-Peer (P2P) information element (IE) in a group owner negotiation request (e.g. see step 704 of FIG. 7) or a group owner negotiation request (e.g. see step 706 of FIG. 7).

The group owner will be determined or selected based on the group owner intent values of the wireless devices. For example, the group owner may be selected by selecting as the group owner the wireless device having, a group owner intent value that is greater than the group owner intent value of the other wireless device. The determination and selection of the group owner may be performed by one of the wireless devices (e.g. the wireless device which responds to the group owner negotiation request). After the group owner is selected, the Wi-Fi P2P network having the connection to the external network is established. The group owner may serve as a mobile hotspot to route data communications for the one or more other connected wireless devices to access the Internet over the data connection via the wireless network.

Thus, techniques in a wireless device for use in negotiating a group owner with another wireless device for establishing a wireless peer-to-peer (P2P) network having a connection to an external network have been described. The wireless device identifies whether it is operating for communications via a home network or a non-home network. The wireless device sets its group owner intent value to an increased value when it is identified to be operating for communications via a home network, or to a decreased value when it is identified to be operating for a non-home network (e.g. a visiting network). The wireless device then sends to the other wireless device a message which includes the group owner intent value for the wireless device. Once the group owner is determined, the wireless device will connect with the other wireless device for establishing the wireless P2P network having the connection to the external network.

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11-based network, for example, different environments may be applicable as well. As a few other examples, the wireless networking may be based on a WiMAX network (i.e. IEEE 802.16), or an Ultra-WideBand (UWB) network (i.e. IEEE 802.15). The invention described herein in the recited claims intends to cover and embrace all suitable changes in technology.

What is claimed is:

1. A method in a wireless device for use in negotiating a group owner with another wireless device for establishing a wireless peer-to-peer (P2P) network having a connection to an external network, the method comprising:
   identifying whether the wireless device is operating for communications via a home network or a non-home network;
   setting a group owner intent value for the wireless device to an increased value when the wireless device is identified to be operating for communications via the home network, or to a decreased value when the wireless device is identified to be operating for communications via a non-home network; and
   sending, to the other wireless device, a message which includes the group owner intent value for the wireless device.

2. The method of claim 1, wherein one of the wireless devices is selected as the group owner based on the group owner intent value, the method further comprising:
   connecting with the other wireless device for establishing the wireless P2P network having the connection to the external network.

3. The method of claim 1, wherein the external network comprises the Internet.

4. The method of claim 1, further comprising:
   setting the group owner intent value for the wireless device with a decreased value when the wireless device is identified to be operating for communications via a visiting network.

5. The method of claim 1, wherein the wireless device comprises a first wireless transceiver operative in accordance with IEEE 802.11 for communications in the wireless P2P network and a second wireless transceiver comprising a cellular radio transceiver for communications via the home network.

6. The method of claim 1, wherein the act of sending the message comprises sending a group owner negotiation request which includes the group owner intent value for the wireless device.

7. The method of claim 1, further comprising:
   wherein the act of sending the message comprises sending a group owner negotiation request which includes the group owner intent value;
   receiving from the other wireless device a group owner negotiation response which includes a group owner intent value for the other wireless device;
   selecting the group owner based at least on the group owner intent values for the wireless device and the other wireless device; and
   sending to the other wireless device a group owner confirmation.

8. The method of claim 1, further comprising:
   receiving from the other wireless device a group owner negotiation request which includes a group owner intent value for the other wireless device;
   wherein the act of sending the message comprises sending a group owner negotiation response which includes the group owner intent value for the wireless device; and
   receiving from the other wireless device a group owner confirmation.

9. The method of claim 1, wherein the wireless device is configured to operate as a mobile hotspot, the method further comprising:

operating as the group owner in the wireless P2P network when operating for communications via the home network.

10. The method of claim 1, wherein the wireless device is configured to operate in accordance with the Wi-Fi Peer-to-Peer (P2P) Technical Specification.

11. A computer program product, comprising:
a non-transitory computer readable medium;
computer instructions stored in the non-transitory computer readable medium;
the computer instructions being executable by one or more processors of a wireless communication device for use in negotiating a group owner with another wireless device for establishing a wireless peer-to-peer (P2P) network having a connection to an external network, by:
identifying whether the wireless device is operating for communications via a home network;
setting a group owner intent value for the wireless device to an increased value when the wireless device is identified to be operating for communications via the home network, or to a decreased value when the wireless device is identified to be operating for communications via a non-home network; and
sending to the other wireless device a message which includes the group owner intent value for the wireless device.

12. A wireless communication device, comprising:
one or more processors;
memory coupled to the one or more processors;
a first wireless transceiver coupled to the one or more processors, the first wireless transceiver being configured for communications in a wireless peer-to-peer (P2P) network;
a second wireless transceiver coupled to the one or more processors, the second wireless transceiver being configured for communications via a wireless network;
the one or more processors being configured to negotiate a group owner with another wireless device for establishing a P2P wireless network having a connection to an external network, by:
identifying whether the wireless device is operating for communications via a home network;
setting a group owner intent value for the wireless device to an increased value when the wireless device is identified to be operating for communications via the home network, or to a decreased value when the wireless device is identified to be operating for communications via a non-home network; and
sending, to the other wireless device, a message which includes the group owner intent value for the wireless device.

13. The wireless device of claim 12, wherein one of the wireless devices is selected as the group owner based on the group owner intent value, the one or more processors being further configured to:
connect with the other wireless device for establishing the wireless P2P network having the connection to the external network.

14. The wireless device of claim 13, wherein the external network comprises the Internet.

15. The wireless device of claim 12, wherein the one or more processors are further configured to:
set the group owner intent value for the wireless device with a decreased value when the wireless device is identified to be operating for communications via a visiting network.

16. The wireless device of claim 12, wherein the first wireless transceiver is operative in accordance with IEEE 802.11 for communications in the wireless P2P network and the second wireless transceiver comprises a cellular radio transceiver for communications via the home network.

17. The wireless device of claim 12, wherein the one or more processors are further configured to send the message by sending a group owner negotiation request which includes the group owner intent value for the wireless device.

18. The wireless device of claim 12, wherein the one or more processors are further configured to:
send the message by sending a group owner negotiation request which includes the group owner intent value;
receive from the other wireless device a group owner negotiation response which includes a group owner intent value for the other wireless device;
select the group owner based at least on the group owner intent values for the wireless device and the other wireless device; and
send to the other wireless device a group owner confirmation.

19. The wireless device of claim 12, wherein the one or more processors are further configured to:
receive from the other wireless device a group owner negotiation request which includes a group owner intent value for the other wireless device;
send the message by sending a group owner negotiation response which includes the group owner intent value for the wireless device; and
receive from the other wireless device a group owner confirmation.

20. The wireless device of claim 12, wherein the wireless device is configured to operate as a mobile hotspot.

* * * * *